June 8, 1965  B. G. E. STIFF  3,187,605
STRAIN WAVE DRIVE
Filed March 26, 1962  5 Sheets-Sheet 1

INVENTOR.
BERNARD G. E. STIFF
BY Kenway, Jenney & Hildreth
ATTORNEYS

June 8, 1965   B. G. E. STIFF   3,187,605
STRAIN WAVE DRIVE
Filed March 26, 1962   5 Sheets-Sheet 2

INVENTOR.
BERNARD G. E. STIFF
BY *Kenway, Jenney & Hildreth*
ATTORNEYS

June 8, 1965  B. G. E. STIFF  3,187,605
STRAIN WAVE DRIVE

Filed March 26, 1962  5 Sheets-Sheet 4

FIG. 10

INVENTOR.
BERNARD G. E. STIFF

BY Kenway, Jenney + Hildreth

ATTORNEYS

June 8, 1965  B. G. E. STIFF  3,187,605
STRAIN WAVE DRIVE

Filed March 26, 1962  5 Sheets-Sheet 5

INVENTOR.
BERNARD G. E. STIFF
BY Kenway, Jenney + Hildreth
ATTORNEYS

United States Patent Office 3,187,605
Patented June 8, 1965

3,187,605
STRAIN WAVE DRIVE
Bernard G. E. Stiff, Lynnfield Center, Mass., assignor of twenty-five percent to William L. Ericson, Marblehead, Mass.
Filed Mar. 26, 1962, Ser. No. 182,586
17 Claims. (Cl. 74—640)

The present invention relates to strain wave gearing of an improved form in which an elastically deformable element is a non-cylindrical body of revolution, and is thus adapted for deflection with three degrees of freedom, i.e., in three dimensions. The present invention is an improvement over strain wave gearing of a type disclosed by U.S. Patent No. 2,906,143 to C. W. Musser, issued September 29, 1959. It is the general object of this invention to provide strain wave gearing which overcomes certain disadvantages and limitations of gearing according to the aforementioned patent.

Strain wave gearing comprises a motion-transmitting device having a pair of coaxial annular elements, such as internal and external ring gears, one of which is relatively rigid and the other elastically deformable and of a different diameter, together with a strain wave generator which engages the deformable element to deflect a working surface thereof into engagement with a working surface of the rigid element at a plurality of circumferentially-spaced positions interspaced by non-mating positions. By rotating the strain wave generator, a strain wave is propagated which rotates about the deformable element and produces relative rotation of the relatively rigid element, characteristically with a high speed reduction with respect to the rotating generator. According to the aforementioned patent to Musser, the surfaces of the rings are cylindrical surfaces of revolution, generated by elements which remain parallel at all times. Gear teeth on the surface of the deformable element therefore have only two degrees of freedom, since they may move only radially and rotationally, while remaining parallel; the system may then be characterized as "two-dimensional." Stated in another way, the gear may deflect only in a plane which is normal to the polar axis of rotation of the unit, and therefore has only two degrees of freedom.

While this type of strain wave gearing provides many specific advantages over conventional gearing, there are certain disadvantages and limitations which arise from its fundamental geometry. Not the least cause of these difficulties is the inherently large stress necessary to radially deflect a deformable cylindrical ring of a suitable material elastically, when the deformation is confined to single planes. The attainable range of gear ratios depends almost entirely on the limits of diametral deflection of the deformable ring, under designed torque loading. The high spring constant which is believed to inhere in a cylindrical form of the deformable ring requiring maintenance of parallelism of its elements with the polar axis, when combined with a torque take-off device, imposes high forces reacting against the strain wave generator, which can result in fretting and cold welding between the generator and the deformable ring, and imposes a practical limitation on the load handling capacity. Further, high bearing loads result. The size of the entire unit must be increased with rising load to satisfy both of the requirements for deflection and for strength of the flexible ring. Large size further increases the necessary mass of the spring wave generator required for sufficient rigidity.

Another problem raised by this gearing system relates to the removal or application of torque to the deformable ring. Since the teeth on the constantly pulsating deformable ring are receiving force application from the mating rigid ring at substantially only one radius, i.e., the pitch line of the rigid ring, and since the teeth of the flexible ring must move radially in planes normal to the polar axis while remaining parallel to that axis, torque must be applied to or taken from the deformable ring at substantially the same radius. This necessitates the provision of a torque take-off device that must fulfill the conflicting requirements of adequate torque handling and of translation of the radial and rotary movement of the teeth on the deformable ring into pure rotation for delivery to an input or output shaft. Further, it is difficult as a matter of design to prevent the torque take-off device from imposing its own spring constant on the deformable ring, with the result that the radial components of a force necessary to deflect the take-off device must be included in the summation of forces required to be imposed radially upon the deformable ring by the wave generator for operation of the device.

In consequence of these inherent problems revolving about the spring constants of the deformable ring and the torque take-off device, severe limitations appear as to the minimum gear ratio which can successfully be provided without incurring relatively high starting torque, which may be excessive in many applications.

The manufacture of strain wave gearing elements in the forms disclosed by the aforementioned patent to Musser also presents some difficulty. Since operation of the device requires sufficient deflection of the deformable ring to clear the opposing teeth of the deformable and rigid rings at circumferentially-spaced points of disengagement, and the magnitude of the gear ratio depends inversely on the magnitude of the deflection, a large reduction requires that the teeth be made as small as possible. The manufacture of very small teeth places a considerable burden on known manufacturing techniques, especially in view of the close tolerances required. The aggregative effect of tolerances among the various part dimensions which combine to control the positions of the mating teeth imposes stringent requirements. However, ordinary methods fail as the required tooth height becomes quite small, and broaching, extrusion, and the like cannot produce the desired tooth form with sufficient accuracy. The form of the tips and roots of the teeth are difficult to maintain, and galling of the material becomes a problem of major proportions.

It is the general object of the present invention to provide an improved strain wave drive mechanism which retains the advantages of strain wave gearing of the cylindrical ring type, but which at the same time overcomes many of the disadvantages thereof. It is another object of my invention to provide a strain wave drive mechanism with a deformable member of a geometric form permitting the attainment of a relatively wide range of spring constants and other deformation characteristics. The forces required to deflect this member, and the starting torque of the drive which depends thereon, are correspondingly reduced. Among other advantages, many design limitations and difficulties of known strain wave drives are obviated, lower gear ratios are made feasible, and manufacturing difficulties are substantially reduced. It should be understood that the present invention is equally applicable to the linear motion type of strain wave drive as it is to the rotary type. A linear motion strain wave drive generally comprises a deformable member and a relatively rigid helically-threaded member of a different diameter, coaxially arranged. Relative axial movement is induced by a strain wave generator acting upon the deformable member to propagate a rotating strain wave which engages peripherally-spaced portions of the deformable member with the threaded member. This type of drive is disclosed by U.S. Patent No. 2,943,508 to C. W. Musser, which issued July 5, 1960; however, the deformable members disclosed therein are of a helically-threaded cylindrical form, and are subject to similar limitations and difficulties to those experienced in cylndrical forms of rotary strain wave drives.

My invention is concerned with the provision in a strain wave drive mechanism of a deformable member which is of a non-cylindrical and non-planar annular form, and is flexible with three degrees of freedom, i.e., in three dimensions. The deformable member therefore comprises an annular body of revolution about a major axis of line segments inclined to the major axis, including but not limited to hollow spherical segments and cones. In the improved drive, motion is induced by a traveling compound strain wave, which applies bending moments about three mutually perpendicular axes to the deformable member. The invention as employed herein comprehends bodies of revolution whose surfaces are generated by segments of the family of lines which includes curved lines, as well as straight lines inclined at an acute angle to a polar axis of revolution, but is intended to exclude cylindrical bodies, and plane surfaced bodies such as radial discs.

Preferably, the body of revolution is open at one axial end and substantially closed at one pole to form a torque take-off device integrally with the deformable member of the strain wave drive. Such an arrangement minimizes the overall spring constant of the complete system. A circular portion of the body adjacent the open end, which is defined by a plane normal to the polar axis, cooperates, when properly flexed with a circular working surface portion of the rigid drive member, of a different radius. The cooperating surface portions are preferably formed with rows of cooperating teeth of different numbers but of the same size and arcuate spacing.

Teeth formed on the surface of a non-cylindrical body of revolution made in accordance with the invention angulate as the body is deflected by the strain wave inducer, rather than merely translating in a two-dimensional manner. Since one of the limiting requirements in strain wave drive gearing is the need to displace the teeth of the mating deformable gear completely from the mating teeth of the rigid gear cyclically, this angulation can be employed to great advantage, particularly in securing large gear ratios requiring a minimal difference in diameter between the deformable and rigid gears. For a given working surface diameter and wall thickness, the additional variable of selective tooth angulation permits latitude in the choice of spring constant. Further, on a non-cylindrical body of revolution, independent choices of working surface diameter and cone angle are available.

The angulatory characteristic of the tooth movement takes place about one or more axes of angulation of the remainder of the body of revolution, which in another plane normal to the polar axis of the body reaches a condition of radial stability, or pure rotation. Such a body therefore integrally forms, in a natural manner, both the deformable member of the gearing and a torque take-off device. The various elements of the body of revolution angulate in the manner of a system of cantilever beams connecting the teeth formed thereon at the polar axis of rotation of the body. This arrangement conforms with the natural action of angulation of teeth as a result of torque take-off therefrom, and the integration of the take-off device and the deformable gear greatly simplifies the design problem.

The formation of teeth on non-cylindrical bodies of revolution formed according to the invention is greatly simplified, since the teeth need not be parallel to the polar axis of rotation. Ordinarily, it is preferable to extend the teeth tangentially to the surface of the deformable member, although they may extend at an angle of incidence thereto if desired for particular applications. Tooth formation may be carried out by axial movement of a forming tool without entailing galling, because of the inclination of the teeth to the polar axis. Such methods as cold forming, stamping, die casting, and the like, lend themselves naturally to the formation of small teeth, in that the small tooth height requires only a small axial movement of the forming member into the material. Where a die is used, die wear is moderate as compared with wear when forming teeth parallel to the polar axis, since the die does not have to travel the length of the teeth.

It will be understood that while the deformable gear or member may comprise any non-cylindrical and non-planar annular body of revolution which is elastically deformable, different characteristics appear in various forms, such as cones and spheres. Spherical segments differ substantially, depending upon the position of the planes normal to the polar axis on which they are cut. Varying spring constants and angulation characteristics appear as the cutting plane is changed, and a wider choice is therefore available to the designer. The range of characteristics available provides wide adaptability of these devices to different methods of restraining the torque take-off device and the deformable gear or member, and to other environmental or boundary conditions of application.

Another advantage of the improved system is that the strain wave generator may assume a variety of desirable forms, since it is not required to apply the deflecting forces to the deformable member in a purely radial direction. For example, a generator having a cam surface formed as a generally radial plane warped in the axial direction, which will hereinafter be referred to as an "axially-offset cam generator" for convenience, can be used to engage an internal or external surface of the deformable member to produce the desired pattern of angulation of the teeth, being rotatable to propagate the strain wave. In a preferred form, rolling balls are interposed between the strain wave generator and the deformable member to minimize rolling friction, being properly spaced to accurately transmit the pattern of angulation. An advantage of the axially-offset cam generator is its ability to control the extent of tooth engagement merely by translational adjustment along the polar axis, thereby obviating the problem imposed on cylindrical strain wave drives by the tolerance build-up that frequently occurs in manufacture. This adjustability of engagement can also compensate for wear of the components throughout their operating life. Further, manufacture of an axially-offset cam generator can be carried out simply by single-axis translation of a forming tool along the polar axis, such as by forging, coining, or the like. However, elliptical wave generators in which ellipses lying in planes normal to the polar axis are employed, such as are disclosed by C. W. Musser in United States Patent 3,001,840, issued September 26, 1961, may alternatively be utilized with accrual of some of the advantages of the axially-offset cam type.

According to another feature of the invention, the non-cylindrical strain wave drive may be utilized to transmit motion through an hermetically-sealed wall for use in fluid-handling apparatus, vacuum apparatus, and the like. The deformable member may comprise a portion of the hermetically-sealed wall, or may form a component co-axial therewith. While this function may also be performed by strain wave drives of the cylindrical type, it is necessary to extend the deformable member in both axial directions from the cylindrical toothed portion, to maintain parallelism of the teeth to the polar axis as the sealed wall is flexed. The length of the unit may be substantially reduced when a non-cylindrical strain wave drive is substituted, since parallelism need not be maintained.

The improved non-cylindrical strain wave drive is particularly applicable to linear-motion strain wave drives of a type generally disclosed in the aforementioned U.S. Patent No. 2,943,508 to C. W. Musser. In this instance, an open end of the body of revolution comprising the deformable member engages spaced-apart circumferential portions of a helically-threaded rigid member. Propagation of a rotating strain wave in the deformable member causes the body of revolution to translate along the polar axis, as sequential points on the periphery of the open end contact the thread; rolling rather than sliding engagement is experienced. Similar advantages to those afforded by the use of non-cylindrical strain wave gearing are provided in linear motion drives, whether the rigid element of the drive comprises an internal or external thread.

While the specification concludes with claims particularly pointing out the subject matter which I regard as my invention, It is believed that a clearer understanding may be gained from the following detailed description of a preferred embodiment thereof, referring to the accompanying drawings, in which:

According to the invention, a strain wave drive comprises, in combination with a relatively rigid member and a strain wave generator, a deformable member which is a non-cylindrical and non-planar annular body of revolution, that is, has working surfaces generated by the revolution about a polar axis of line segments inclined at acute angles to the polar axis. The most common forms include segments of spheres and of cones; however, forms generated by other curved lines, which may be convex toward or convex away from the polar axis, are also comprehended and may be particularly useful for special applications.

The deformable member has at least one end opened by an intersecting plane, which preferably is normal to the polar axis; in gearing embodiments, teeth are formed circumferentially about this surface internally or externally, and will ordinarily extend tangentially thereto, adjacent to the open end of the member. The opposite axial end of the deformable member may be closed or opened just sufficiently to form an integral torque take-off means. Such a member flexes naturally in such a manner that its open end and the teeth thereon may be deflected quite easily into a substantially elliptical or other non-circular configuration for cooperation with a working surface of the rigid member. However, the closed end of the deformable member remains free of radial distortion, because of the natural tendency of elements of the body lying in axial planes to flex in the manner of a simple beam about the closed pole. The combined rotation and radial flexure of the open end of the deformable member is thus translated into pure rotation in the vicinity of the closed pole for torque take-off, and suitable shafting or the like may be rigidly attached at the closed pole for this purpose.

Alternatively, the deformable body may be opened at two ends by spaced planes normal to the polar axis, in which instance two working surface portions adjacent the openings will each cooperate with working surfaces of mating rigid members, and will ordinarily each be formed with a set of teeth for this purpose. It should be understood that frictional driving engagement between the working surfaces of the deformable and rigid members may be relied on without the use of cooperating teeth, but such an arrangement is limited to relatively low torque applications by the available coefficients of friction between the members.

Figure 1:
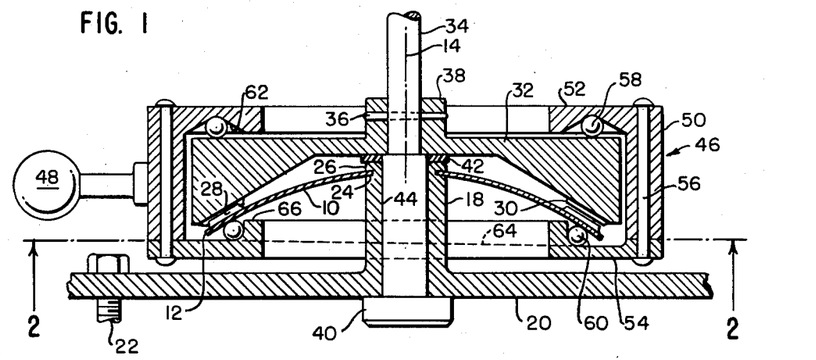
FIG. 1 is a sectional view in elevation of an embodiment of the invention in a manually-operated precision drive, taken along line 1—1 in FIG. 2, looking in the direction of the arrows.
Figure 2:
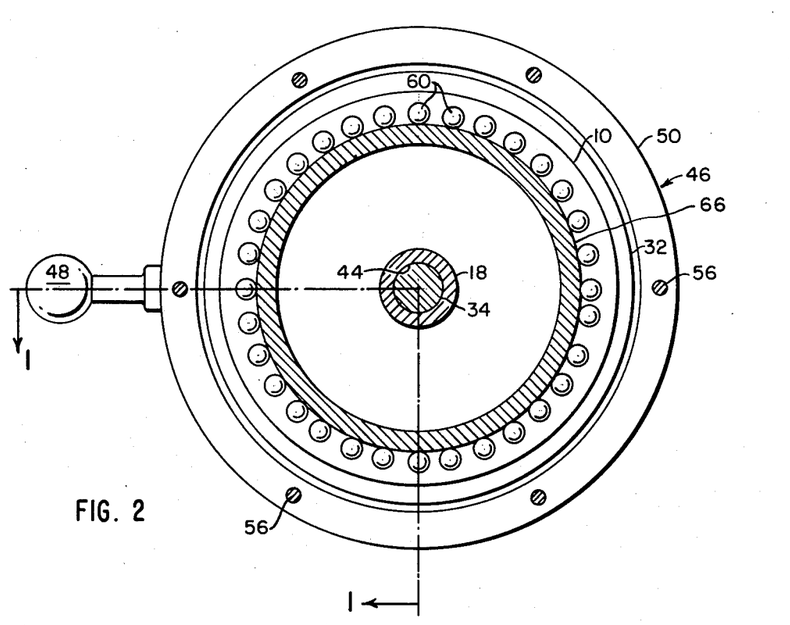
FIG. 2 is a sectional plan view taken along line 2—2 in FIG. 1, looking in the direction of the arrows.

Referring to FIGS. 1 and 2, an embodiment of the invention is shown in a manually-operated precision drive for an indexing table or the like. A deformable member 10 in this case is formed as a minor segment of a sphere cut at an open end 12 by a plane normal to its polar axis of revolution 14. The closed pole of the member is supported and restrained against rotation by means of an upstanding cylindrical boss 18, which protrudes from a base plate 20 secured to a stationary support (not shown) by bolts 22 or other suitable means. The member 10 is gripped upon a reduced end portion 24 of the boss 18 by upsetting an end portion 26 thereof.

Adjacent the open end 12, the outer surface of the member 10 is formed with a circumferentially-spaced row of teeth 28, which are preferably of a triangular cross-section, for cooperation with a mating circumferential row of teeth 30 formed on an inverted female conical gear 32, comprising the rigid member of the strain wave drive. The gear teeth 30 are slightly greater in number than the teeth 28, being of the same arcuate spacing but at a greater radius, according to well-known principles of strain wave gearing previously referred to. As shown, the teeth preferably extend tangentially to the surface of the deformable member 10, but may be inclined at an angle thereto if desired.

The rigid member or gear 32 is secured to an output shaft 34 by suitable means such as a pin 36 passing radially through the shaft and a hub 38 of the gear. Thrust bearings for the shaft 34 include an enlarged head 40 engaging the lower surface of the plate 20 to form a plain bearing, and a plain bearing ring 42 positioned between the gear 32 and the upset portion 26 of the hub 18.

A strain wave generator generally designated 46 is arranged for manual operation by a handle 48 secured thereto. However, it will be understood that mechanical drive means of any well-known type may be utilized in place of the handle. The strain wave generator comprises a first annular member 50 of generally cylindrical form, having a circumferential flange 52 extending radially inwardly therefrom at an upper axial end. At its lower end, the generator is completed by an annular disc 54 secured thereon by suitable fasteners such as rivets 56 spaced circumferentially thereabout. The member 50 thus forms a cylindrical annulus between whose flanges 52 and 54 the peripheries of the members 10 and 32 may be engaged by rows of bearing balls 58 and 60. The balls 58 ride in an undercut circular race 62 in the flange 52, in a plane path normal to th polar axis 14, to act as thrust bearings for the member 32 for maintaining its alignment normal to the polar axis.

As is disclosed in detail by the aforementioned U.S. Patent No. 2,906,143 to Musser, the actuation of strain wave drive mechanisms involves the flexure of a deformable member to engage the teeth of a rigid member at circumferentially-spaced points, and to disengage the teeth at interspaced points. There may be two, three, or more circumferentially-spaced regions of engagement, depending upon the form of the strain wave generator. In the present instance, the strain wave is propagated by a race 64 formed on the disc 54, comprising an axially-offset cam in which the balls 60 ride to transmit a strain wave to the deformable member 10. The race is formed as a substantially radial axially-warped surface having two high points spaced 180° thereabout, and two low points interspaced 90° from the high points. The quadrant shown in FIG. 1 illustrates one of each of these points, spaced at 90°. Thus, the teeth 28 and 30 seen at the left side of FIG. 1 are fully engaged, while those seen at the right are fully disengaged. It will be apparent to those familiar with the operation of strain wave gearing that rotation of the handle 48 about the polar axis will produce an output rotation of the shaft 34 of relatively high torque and low angular velocity, depending upon the specific gear ratio of the unit.

Figure 3:
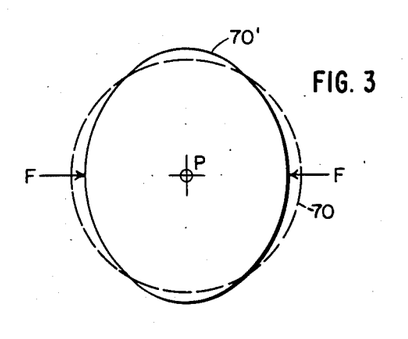
FIG. 3 is a view taken along the polar axis of a deformable element of the type utilized in the drive of FIGS. 1 and 2, showing the mode of deformation thereof.
Figure 4:
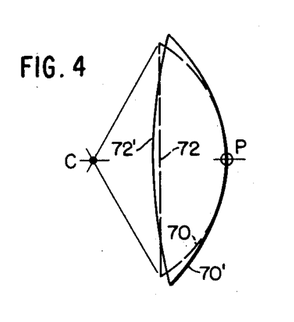
FIGS. 4 and 5 are views in side elevation of the deformable member of FIG. 3, looking radially inwardly from points spaced 90° apart about the polar axis.
Figure 5:
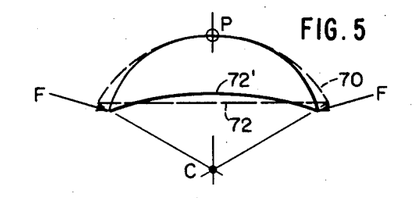

FIGS. 3–5 illustrate the mode of deformation of a deformable member 70 when subjected to opposed balanced forces F on a diameter thereof. The resulting deflected form is shown at 71' in full lines. The member 70 comprises a minor spherical segment having an open end 72 formed by cutting a sphere on a plane normal to the polar axis PC with an included angle at the center of the sphere of less than 180°. In this instance, a closed pole P is arranged for torque take-off, and the member is similar to that disclosed in the embodiment of FIGS. 1 and 2. It will be observed that portions of the periphery at the open end of the member which are spaced at about 90° from the diameter of force application tend to increase their slope positively when deflected, while the peripheral portions near the points of force application tend to decrease their slope, and if sufficiently deflected will actually assume a negative slope. It will be understood that the regions of engagement of the periphery with a mating rigid member would be in the vicinity of the diameter of force application in the case of an internal rigid member, but near the diameter spaced 90° therefrom in the case of an external one. It should also be noted that the portion of the member in the region of the closed pole P experiences no radial deflection, but remains truly spherical in form. Elements of the spherical body lying on great circles passing through the pole P may be considered as lying on curved beams which assume a different curvature upon deflection, and are elastically connected to adjacent elements to act as compound curved beams. A complex moment of inertia results which may enhance the torque-carrying ability of the member as a torque take-off device.

It should also be noted that the plane of the open end 72 becomes warped to the position 72' under deflection, but that inasmuch as the periphery engages the rigid member only at circumferentially-spaced portions of the member 70 which undergo the same deflections, teeth formed tangentially to the surface, or at an angle of inclination thereto, may be arranged to engage smoothly and accurately with teeth of the mating rigid member or gear. As the strain wave rotates, the working peripheral surface of the deformable member and the teeth thereon engage and disengage the working surface and teeth of the rigid member not merely by radial displacement, but also by angulation, as the slope of the surface changes. This feature can aid materially in obtaining proper disengagement of the teeth within a limited deflection.

Figure 6:
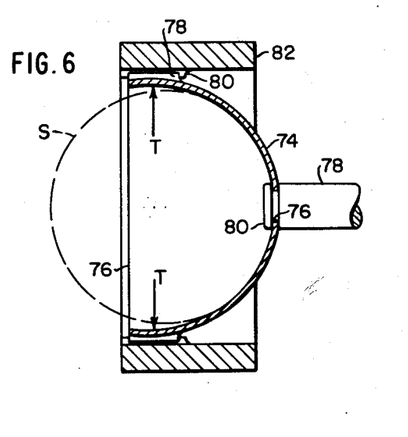
FIGS. 6 and 7 are sectional views of a modified deformable member, looking radially inwardly from points spaced 90° apart about the polar axis, in conjunction with a rigid member of a strain wave gearing system.
Figure 7:
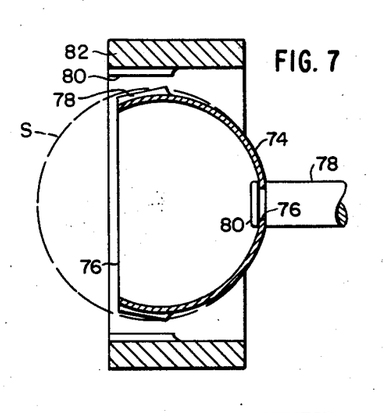

A change in the included angle of the spherical segment materially changes the mode of deflection, and two distinct families of behavior are noted in cone angles less than 180° and those in the range of 180–360°. An example of the latter family is shown in FIGS. 6 and 7 in a deformable member 74 having an open end 76 cut by a plane in such manner that the included angle with the center of the sphere, or angle of closure, exceeds 180°. The sphere corresponding to the undeflected member is shown in dotted line at S to clarify the mode of deflection induced in the member by diametral forces T. The member is shown deflected in a manner to engage circumferentially-spaced groups of a row of teeth 78, formed about the periphery of the member 74 near its open end 76, with portions of a row of mating teeth 80 spaced about the inner cylindrical surface of an annular cylindrical rigid gear 82. As the member 74 is deflected, the slopes of the working surface and the teeth 78 lying in the vicinity of the plane of FIG. 6 increase from a negative value through a point of zero slope in parallelism with the polar axis, and then increase positively. The teeth in the vicinity of the axial plane of FIG. 7, spaced 90° from the plane of FIG. 6, increases in negative slope. In this instance, as in the case of the family of spherical segments having an angle of closure less than 180°, the value of the slopes at points spaced 90° apart about the periphery of the open end are of different values, and the rate of change of the slopes with the increasing deflection are of different values. Further, the sign of the slopes may change at a different stage of deflection.

It will be apparent that advantage may be taken of these characteristics to adapt spherical segments of different degrees of closure to particular applications. Wide latitude in the choice of spring constant is available even when the working surface diameter and wall thickness are fixed in value, because of the flexible choice of angulation characteristics. The working surface diameter, and the cone angle defined by tangents to the working surface, are independent variables which further enhance design flexibility.

Figures 8, 9:
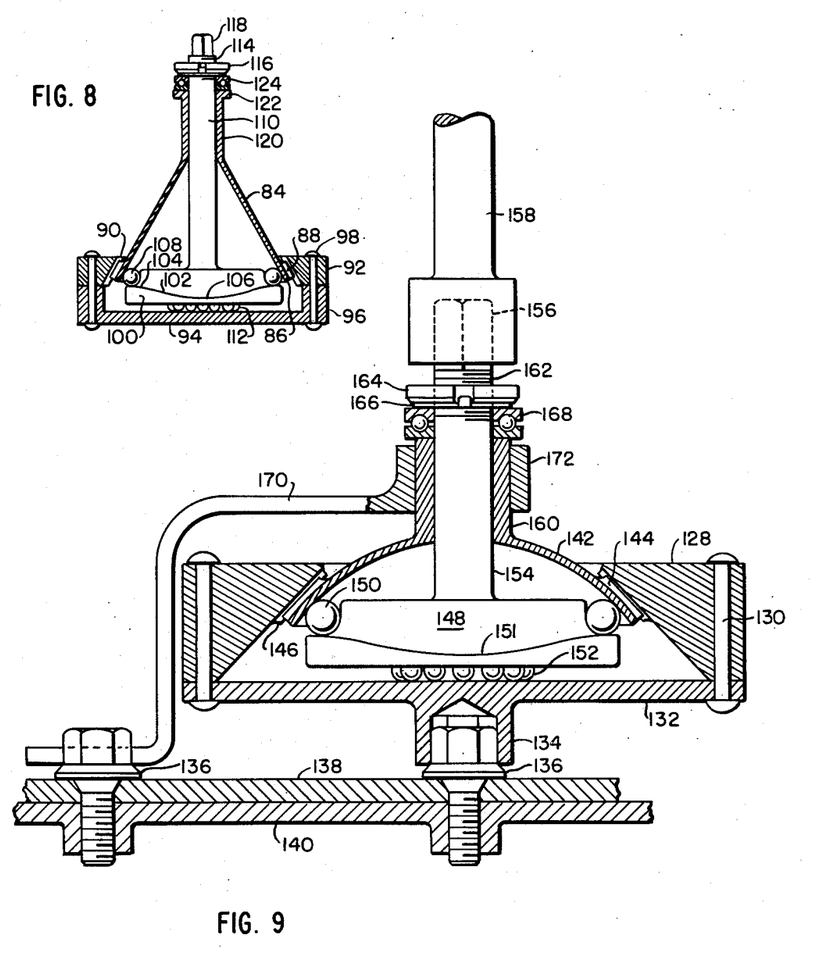
FIG. 8 is a sectional view in elevation of another form of strain wave drive, having a conical deformable member.
FIG. 9 is a sectional view in elevation of a strain wave drive incorporated in a wrench for threaded fasteners.

Another highly useful body of revolution is the cone, and an embodiment of this nature is shown in FIG. 8. In a conical body of revolution, flexure tends to occur as pivotal movement of the cone elements about the cone apex, when the cone is substantially closed at one end. However, the body does nullify radial deflection near the apex, and so is well suited for torque take-off. A frustum of a cone, open at each end, flexes in a different manner quite useful in other applications; the elements tend to pivot about their longitudinal centers, which combine to define a circle that is not materially distorted by deflections induced in the ends of the body.

In FIG. 8, a conical deformable member 84 is formed about an enlarged open end 86 with a circumferentially-spaced row of teeth 88 extending parallel to the elements of the cone, for cooperation with a ring of teeth 90 of a conical rigid gear 92. To secure the members in operably-spaced relation, a case 94 is formed with a cylindrical annular flange 96 attached to the conical gear 92 by fastening means such as a row of peripherally-spaced rivets 98. A strain wave generator 100 of the axially-offset cam type comprises a disc formed with a peripheral race 102 comprising a substantially radial axially warped plane surface, having two diametrically opposed raised lobes 104 interspaced at 90° by depressed portions 106. A plurality of balls 108, of which only two are shown, are received in the race 102 to engage an interior surface of the member 84 for transmitting a strain wave induced by rotation of the generator 100, which is formed with a shaft 110 extending along the polar axis of the drive for this purpose. A circumferentally-spaced row of balls 112 is interposed between a suitable race (not shown) formed in the lower surface of the generator 100, and the interior surface of the case 94, to sustain the thrust induced by rotation of the strain wave generator.

To provide for adjusting the extent of engagement of the teeth 88 and 90, the upper end of the shaft 110 is threaded at 114 in a nut 116. The shaft end is formed with a square head 118 for driving connection with any desired torque input means (not shown). A cylindrical sleeve 120 is formed as an extension of the member 84 to act as a plain radial bearing for the shaft, and terminates at its upper end in a circumferential flange 122. To space the generator 100 axially with respect to the member 84 in relatively rotatable relation, a ball thrust bearing 124 is interposed between the flange 122 and the nut 116. Rotation of the nut 116 is thus effective to adjust the engagement of the teeth of members 84 and 92 to compensate for wear and to adjust back-lash.

While means for applying and removing torques from the major elements of the drive 84, 92, and 100 are not shown in this embodiment, it will be understood that in the most common application, the generator will be driven by input motive means through the shaft 110, while one of the members 84 or 96 shall be restrained against rotation while the other delivers an output torque, whose value is increased and whose speed is correspondingly reduced in accordance with the particular gear ratio of the unit.

Referring to FIG. 9, an embodiment of the improved strain wave drive is shown in a wrench for conventional threaded fasteners. In this embodiment, a rigid conical gear 128 is secured by peripherally-spaced rivets 130 to a disc 132 which has, along the polar axis of the unit, a socket 134 of female hexagonal form for engagement with the head of a conventional threaded fastener such as a bolt 136. In the illustrative application shown, the wrench is intended for use as a lug wrench for an automobile wheel 138 which is secured to a brake drum 140 by a circumferential row of lug bolts 136. However, it will be understood that the wrench is of general adaptability, and may have a socket to engage any type of threaded fastener.

The deformable member 142 comprises a minor segment of a sphere, similar to that in the embodiment of FIGS. 1 and 2, formed with a circumferential row of teeth 144 for cooperation with a row of teeth 146 on the gear 128. A strain wave generator 148, which is similar to the generator 100 in the embodiment of FIG. 8, cooperates with the deformable member 142 by means of a row of balls 150 riding in an axially-offset cam surface 151. A row of balls 152 interposed between the generator and the interior surface of the disc 132 provides a thrust bearing for the generator.

A drive shaft 154 has a squared end 156 receivable in a lug wrench 158, for driving the strain wave wrench manually. As in the foregoing embodiment, the deformable member is extended into a sleeve 160 to form a plain radial bearing for the input drive shaft 154. The shaft is threaded at 162 for engagement by a lock nut 164 to adjust the engagement between the gear teeth 144 and 146. In the preferred form shown, the lock nut is castellated for locking engagement with a lug washer 166 interposed between the lock nut and a ball thrust bearing 168, which rests upon the upper end of the sleeve 160.

To restrain the deformable member 142 against rotation as the shaft 154 is manually rotated, an arm 170 is received in axially-slidable but non-rotatable relationship upon an outer surface of the sleeve 160, having a mating cylindrical flange 172 for engagement therewith. The outer surface of the sleeve 160 may be polygonal, but the means chosen for restraining the arm is not material, and none is shown in the drawings. As the hand wrench 158 is revolved to loosen or tighten a bolt 136 engaged by the socket 134, the arm 170 rotates until it strikes an adjacent one of the lug bolts, as shown. Continued rotation then serves to thread the bolt received in the socket, with a torque multiplication which depends upon the gear ratio of the particular drive.

The improved strain wave drive is also adaptable to the transmission of torque through an hermetically-sealed wall, and makes it possible to reduce the axial length of such a drive relative to that which is required with a cylindrical form of strain wave gearing. In this environment, one axial end of the deformable member must be closed, and the other end must be sealingly engaged with an hermetically-sealed enclosure in a manner which forms an internal communication for torque transmission into the enclosure. In the cylindrical form of strain wave drive, it is necessary to provide symmetrical portions in the opposite axial ends of the deformable body, in order to maintain parallelism of the cylindrical working surface and the teeth thereon; otherwise angulation of the teeth would take place which is unacceptable. In the case of a non-cylindrical strain wave gearing however angulation is acceptable and the body need not be symmetrical in axially opposite directions from the working surface; consequently it may be materially reduced in length while maintaining desirable deflection characteristics.

Figure 10:
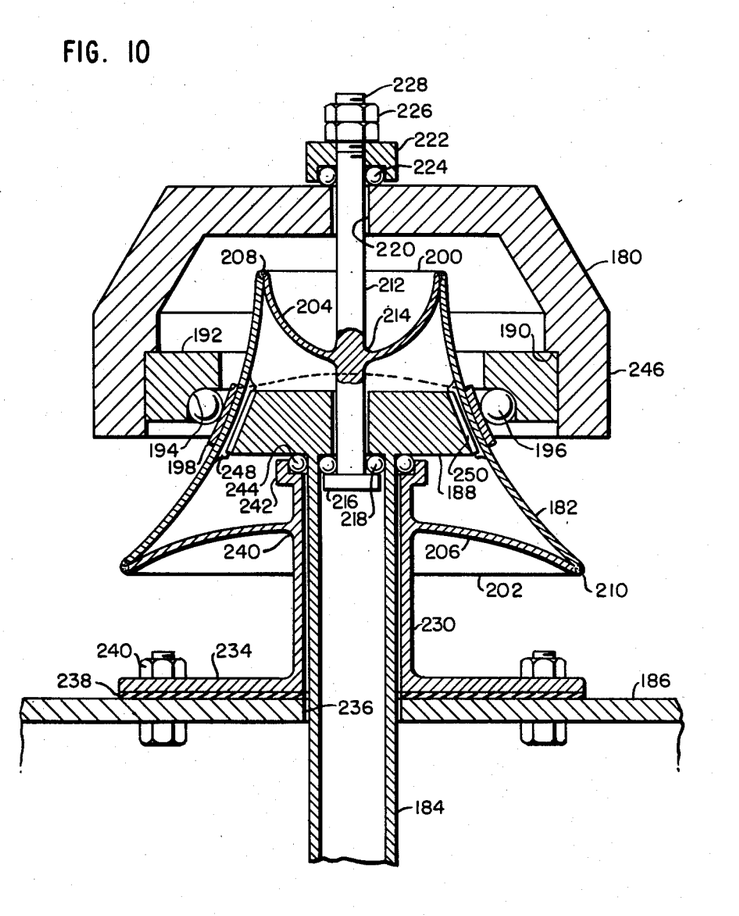
FIG. 10 is a sectional view in elevation of an embodiment of the invention in an hermetically-sealed strain wave drive.

An embodiment of an hermetically-sealed drive is shown in FIG. 10 which is adapted to transmit torque from a rotating input bell 180 through the wall of an hermetically-sealed deformable member 182 to a drive shaft 184 extending interiorly of a sealed enclosure 186, by means of a rigid conical gear 188 secured to the drive shaft. The input bell 180 is provided interiorly with a circular shoulder 190, against which is seated a press-fit strain wave generator ring 192 having formed interiorly thereof a cam race 194 of the axially-offset type previously described. A circumferential row of bearing balls 196 transmit the strain wave through a frusto-conical ring 198 snugly received upon the outer surface of the member 182. The ring 198 serves to increase the wear resistance of the thin-walled member 182.

The deformable member in this instance comprises a body of negative revolution generated by a curved line concave toward the polar axis, and having an upper end 200 and a lower end 202 cut on spaced planes normal to the polar axis. The upper end 200 is partially closed by an inverted substantially hemispherical flexural body 204, and the lower end by a flexural body 206 comprising a minor segment of a sphere. The closure members are secured by circumferential welds at 208 and 210, respectively, to form an integral sealed body, whose mode of flexure conforms to the previously stated principles of the invention.

To maintain radial alignment of the member 182 with respect to the strain wave generator 192 under the three-axis moments imposed by the propagation of the strain wave, a stub shaft 212 passes through the closure element 204 along the polar axis, and is welded thereto at 214. The stub shaft terminates at its lower end in an enlarged head 216 forming a race for a row of balls 218, comprising a thrust bearing between the member 182 and the gear 188. At its upper end, the shaft 212 passes through an opening 220 in the bell 180, and is adjustably supported on a thrust bearing comprising a cap race 222 and balls 224, by means of nuts 226 engaging threads 228 at the upper end of the shaft. As in the foregoing embodiments, the axial adjustability of the shaft provides compensation for wear and back-lash of the gear teeth of the drive.

The deformable member 182 is supported stationarily on the enclosure 186 by means of a hollow standard 230 having a radial flange 234. The standard is sealingly engaged in alignment with an opening 236 in the enclosure by means of a ring gasket 238 and a peripheral row of threaded fasteners 240. In manufacture, the standard 230 is passed through a suitable opening in the closure 206 along the polar axis, and is welded therein at 240 to complete the sealed enclosure. To provide a thrust bearing for the driven gear 188, the standard 230 extends upwardly into a bearing race cup 242 having a row of bearing balls 244 received therein.

In operation, the bell 180 may be driven rotationally by a belt received about an outer cylindrical surface 246 thereof, or in any other desired fashion. The propagation of a strain wave through the stationary deformable member 182 to a row of teeth 248 formed interiorly thereof, drives the gear 188 by means of a row of teeth 250 thereon, and thus rotates the shaft 184.

It should be noted that although the deformable member 182 is radially flexed in the vicinity of its teeth 248, the flexure of the elements of the deformable member and the closures 204 and 206 does not transmit this radial deflection to the polar axis, and it is consequently possible to secure the deformable member to rigid supporting elements in the vicinity of that axis. It should also be emphasized that the mode of angulation of the deformable member makes it unnecessary to provide symmetrical end portions in this member extending in axially opposite directions from the working surface comprising the teeth.

Figure 11:
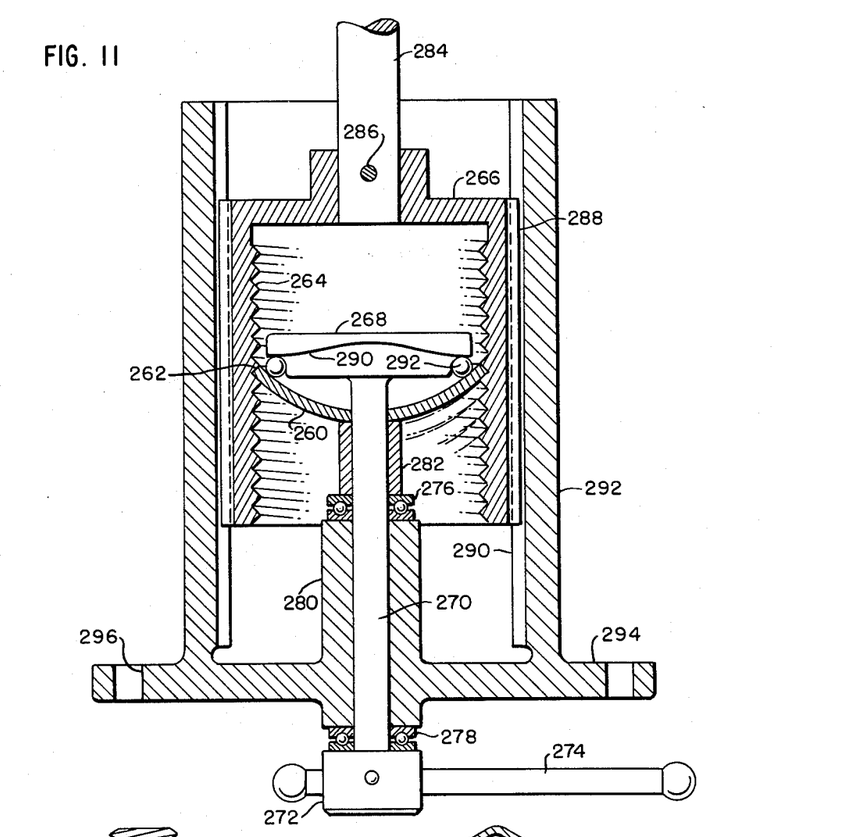
FIG. 11 is a sectional view in elevation of another embodiment of the invention in a linear motion strain wave drive.

The improved strain wave drive is equally adaptable for conversion of rotary to linear motion; an embodiment comprising linear motion drive is shown in FIG. 11. The general principles of linear motion strain wave drives are fully discussed in U.S. Patent No. 2,943,508 to C. W. Musser, previously referred to, and no further detailed discussion of the general principles is believed necessary. In general, these drives transform a rotational input into a rectilinear output, through the cooperation of a rotating strain wave generator, a relatively rigid member, and a deformable member having a working surface portion which directly or indirectly engages circumferentially-spaced portions of the working surface of the rigid member, interspaced by disengaged portions. The working surface of the rigid member is formed with grooves extending at an angle to the polar axis of the drive, which may comprise, for example, helical threads or circular grooves. While relative rotation between the deformable member and the threaded member may take place, this is not essential, since the relative linear movement between these members takes place through a "walking" action as the regions of thread engagement rotate about the deformable member with the deflection-inducing strain wave. Among the most important advantages of this type of linear motion drive are the minimization of sliding friction which arises from the relatively minor extent of the radial sliding motion occurring between the deformable member and the threads; the circumferential movement of the regions of engagement entails rolling, rather than sliding engagement between the members.

In the embodiment of FIG. 11, a deformable member 260 comprises a minor segment of a sphere, which in the undeflected condition is of a slightly smaller dimension across its periphery 262, measured radially of the polar axis, than the pitch diameter of an internal helical thread 264 formed interiorly of an annular cylindrical output member 266. A strain wave generator 268 is drivingly connected, by means of a shaft 270 and a hub 272 affixed thereon, to a handle 274 for applying an input torque to drive the member 266 rectilinearly along the polar axis of the unit. Ball thrust bearings 276 and 278 are spaced along the shaft 270 at opposite ends of an annular sleeve portion 280, which forms a plain bearing for the shaft, to absorb the axial reaction produced by the strain wave generator. For positioning the deformable member 260 axially with respect to the strain wave generator, the former is affixed to a cylindrical sleeve portion 282 resting upon the thrust bearing 276.

The output member 266 is secured to a driven rod 284 by means of a pin 286, for rectilinearly driving any desired device (not shown). To restrain the output member against rotation, it is formed with circumferentially-spaced axial splines 288 slidably received within internal axial splines 290 of an annular casing 292, in which the sleeve 280 is internally formed. In the embodiment shown, the casing is provided with a circumferential flange 294 having openings 296 for attaching the drive to a suitable base.

The periphery 262 of the deformable member 260 is shaped, in radial section, to conform to the teeth 264, for smooth driving engagement therewith. The strain wave generator 268, which is of an axially-offset cam type previously described in detail, has a cam surface 290 cooperating with a row of balls 292 for deflecting the member 260 outwardly at the circumferentially-spaced portions shown, which in this instance are spaced 180° apart to form a two-lobe system. The lobes are interspaced by depressed regions of which one appears in the drawing, in which the balls 292 permit the cooperating portions of the periphery 262 to angulate out of engagement with the threads 264.

As the handle 274 is rotated, a strain wave is propagated which causes the member 260 to translate the output member 266 and the rod 284 axially, but which does not necessarily entail rotation of the deformable member. It will be understood that as the strain wave rotates, a given segment of the periphery of the deformable member engages between two adjacent turns of the thread, then angulates upwardly and radially inwardly out of thread engagement, and finally engages the next axially-successive turn of the thread as the opposite lobe of the strain wave inducer deflects it outwardly once again. The features and advantages of the application of the improved non-cylindrical strain wave drive accrue in substantially the same manner and for the same reasons as have previously been discussed in connection with rotary strain wave drives. It will be understood that other forms of strain wave generators, such as a cylindrical radially-lobed cam, may be substituted for the preferred axially-offset cam type shown.

Figure 12:
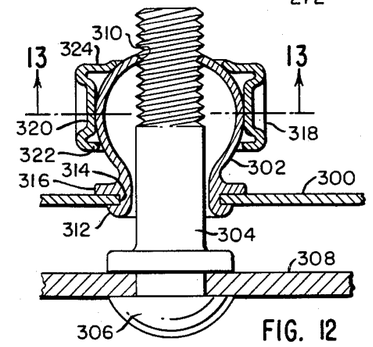
FIG. 12 is a sectional view in elevation of still another embodiment in a threaded fastener.
Figure 13:
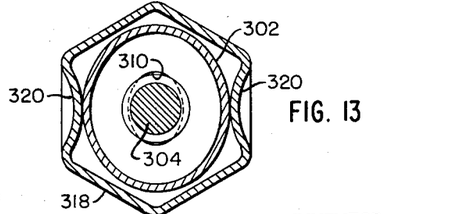
FIG. 13 is a sectional plan view taken along line 13—13 in FIG. 12, looking in the direction of the arrows.

Another form of linear motion strain wave drive according to the invention is shown in FIGS. 12 and 13, embodied in a threaded fastener. One of the advantages of this fastener is that a structural member such as a plate 300 may have a deformable member 302 permanently affixed non-rotatably thereon, and yet be removably attachable thereby on a screw 304, which is also permanently affixed non-rotatably on another structural plate 308, as by an upset head 306. The deformable member 302 comprises a major segment of a sphere axially open at one end to form a thread-engaging working surface 310, and opened at the other end into an upsettable protrusion 312 for firmly securing the member in an opening 314 of the plate 300, against a circumferential flange 316. The plate 300 is attachable to the plate 308 by passing the lower open end of the member 302 over the screw 304, to engage circumferentially-spaced portions of the working surface 310 with corresponding opposed portions of the thread.

To deflect the working surface into this engagement, and for propagation of a strain wave about the polar axis of the unit, a strain wave generator comprising a hexagonal sheet metal body 318 is provided, having opposed inwardly-projecting lobes 320 for engaging the surface of the member 302 at points spaced about the equator, or great circle normal to the polar axis, of its spherical form. It should be noted that the deformable member 302 flexes in such a manner that the radial distortion of the equator and of the working surface 310, is not transmitted to the lower portion attached to the plate 300. The generator 318 is provided at its axial ends with inwardly-extending circumferential flanges 322 and 324, to support the generator in operative relation on the deformable member 302. These parts may be assembled, prior to engagement with the screw 304, merely by pressing the generator axially into place over the deformable member. Rotation of the generator produces linear motion of the member 302 and the plate 300 along the screw 304 without entailing relative rotation between the screw and the deformable member.

While I have described preferred embodiments of my invention by way of illustration, it will be understood that various changes and modifications may readily occur to those skilled in the art without departing from the true spirit and scope thereof. It should be noted that the provision of teeth on either one or both of the deformable and rigid members is not essential to the practice of the invention, but is dictated by the requirements of particular applications. The teeth may be formed in various additional ways, such as by fluting the working surfaces in a permanently-deformed scalloped pattern, for example. The choice of materials for the elements of the drive is not restrictive, but may be made with due regard to any required modulus of elasticity and strength. It is to be noted that the principles of the invention are applicable to various types of strain wave

What I claim and desire to secure by Letters Patent of the United States is:

1. In a strain wave drive: a relative rigid member having a circumferential working surface; an elastically deformable member having a working surface portion of a different diameter when undeflected from that of said circumferential working surface; said members being coaxially arranged one circumferentially spaced about the other, said circumferential working surface and said working surface portion each being formed with cooperating grooves;

a strain wave generator engaging said deformable member to deflect said working surface portion thereof into engagement with said circumferential working surface of said rigid member at a plurality of circumferentially-spaced areas interspaced by non-engaging areas, said strain wave generator being rotatable about the polar axis of revolution of said deformable member to propagate a rotating strain wave to produce relative movement between said rigid and deformable members;

at least said circumferential working surface of said rigid member, and said working surface portion of said deformable member when in an undeflected condition, comprising annular bodies of revolution about a major axis of line segments inclined to said major axis, such that in their mutually-engaged areas, said working surface portion and said circumferential working surface lie substantially in coincidence to fully engage the cooperating grooves;

said deformable member being constructed and arranged for angular deflection by said generator of said working surface portion about a point lying on said major axis, to facilitate engagement and disengagement of said grooves.

2. A strain wave drive as recited in claim 1, in which said body of revolution integrally forms said working surface portion and a torque take-off portion in said deformable member, such that said torque take-off portion remains substantially free of radial deflection when said working surface portion undergoes radial deflection induced by said strain wave generator.

3. A strain wave drive as recited in claim 1, in which said deformable member is open at two axial ends at intersections with two parallel planes passed normally to the polar axis of said body.

4. A strain wave drive as recited in claim 1, in which said strain wave generator is formed with a cam surface of an irregular form having a non-uniform axial locus to induce a selected mode of deflection in said deformable member.

5. A strain wave drive as recited in claim 1, in which said strain wave generator is formed with an axially-offset cam surface comprising a substantially radial plane warped in the axial direction to form at least two axially-protruding lobes equally spaced circumferentially about said cam surface.

6. A rotary strain wave drive as recited in claim 1, in which said deformable member is fully enclosed in interior-communication with an hermetically-sealed enclosure by sealing engagement therewith, a first one of said rigid member and said strain wave generator being located in internal engaging relation with said deformable member and being arranged to transmit output rotation from said drive to the interior of said enclosure through said interior communication, and the other of said strain wave generator and said rigid member exteriorly engaging said deformable member for transmission of an input torque therefrom through a wall of said deformable member.

7. In a rotary strain wave drive: a relative rigid member having a circumferential working surface; an elastically deformable member having a working surface portion of a different diameter when undeflected from that of said circumferential working surface; said members being coaxially arranged one circumferentially spaced about the other, said circumferential working surface and said working surface portion each being formed with cooperating teeth;

a strain wave generator engaging said deformable member to deflect said working surface portion thereof into engagement with said circumferential working surface of said rigid member at a plurality of circumferentially-spaced areas interspaced by non-engaging areas, said strain wave generator being rotatable about the polar axis of revolution of said deformable member to propagate a rotating strain wave to produce relative movement between said rigid and deformable members;

at least said circumferential working surface of said rigid member, and said working surface portion of said deformable member when in an undeflected condition, comprising annular bodies of revolution about a major axis of line segments inclined to said major axis, such that in their mutually-engaged areas, said working surface portion and said circumferential working surface lie substantially in coincidence to fully engage the cooperating teeth;

said deformable member being constructed and arranged for angular deflection by said generator of said working surface portion about a point lying on said major axis, to facilitate engagement and disengagement of said teeth.

8. A strain wave drive as recited in claim 7, in which said strain wave generator is mounted in axially-adjustable relation to said deformable member for correcting tooth engagement for wear and back-lash.

9. A rotary strain wave drive as recited in claim 7, together with means for operatively engaging a threaded fastener for rotation thereof, said means being drivingly engaged with one of said rigid and deformable members, and means drivingly engaged with the other of said rigid and deformable members for restraining rotation thereof, said strain wave generator being formed with means for applying an input rotation thereto to rotate said threaded fastener.

10. In a linear motion strain wave drive, a relatively rigid member having a circumferential working surface formed with grooves extending at an agle to a polar axis of said drive, an elastically deformable member having an opening at one axial end thereof and an adjacent annular working surface portion of a different diameter when undeflected from the effective diameter of said circumferential working surface, at least said working surface portion of said deformable member comprising, in an undeflected condition, an annular body of revolution about a major axis, of line segments inclined to said major axis, said members being coaxially arranged on said polar axis one circumferentially spaced about the other, and a strain wave generator engaging said deformable member to deflect said working surface portion of said deformable member into engagement with the grooves of said circumferential working surface of said rigid member at a plurality of circumferentially-spaced positions interspaced by non-engaging positions, said strain wave generator being rotatable about the polar axis of revolution of said deformable member for propagating a rotating strain wave to produce relative linear motion of said rigid and deformable members along said polar axis.

11. A linear motion strain wave drive as recited in claim 10, in which said working surface of said rigid member is grooved with an helical thread extending along said polar axis.

12. A linear motion strain wave drive as recited in claim 10, together with a pair of structural members, each of said deformable and rigid members being affixed in non-rotatable relation to a different one of said structural members, whereby said structural members may be detachably secured by engagement of said deformable member in said grooves through rotation of said strain wave generator, without incurring relative rotation between said structural members.

13. A linear motion strain wave drive as recited in claim 10, together with means for restraining said deformable and rigid members against rotation relative to one another, whereby said deformable and rigid members may be detachably secured by engagement of said deformable member in said grooves through rotation of said strain wave generator, without incurring relative rotation between said deformable and rigid members.

14. In a strain wave drive, a relatively rigid member having a circumferential working surface, an elastically deformable annular member having a working surface portion of a different diameter when undeflected from that of said circumferential working surface, said deformable member being a body of revolution about a major axis and comprising a spherical segment when in an undeflected condition, said members being coaxially arranged one circumferentially spaced about the other, said circumferential working surface and said working surface being formed circumferentially with cooperating grooved surfaces, and a strain wave generator engaging said deformable member to deflect said working surface portion thereof into engagement with said circumferential working surface of said rigid member at a plurality of circumferentially-spaced positions interspaced by non-engaging positions, said strain wave generator being rotatable about the major axis of said deformable member to propagate a rotating strain wave to produce relative movement between said rigid and deformable members.

15. In a strain wave drive, a relatively rigid member having a circumferential working surface, an elastically deformable annular member having a working surface portion of a different diameter when undeflected from that of said circumferential working surface, said deformable member being a body of revolution about a major axis and comprising a segment of a cone when in an undeflected condition, said members being coaxially arranged one circumferentially spaced about the other, said circumferential working surface and said working surface portion being formed circumferentially with cooperating grooved surfaces, and a strain wave generator engaging said deformable member to deflect said working surface portion thereof into engagement with said circumferential working surface of said rigid member at a plurality of circumferentially-spaced positions interspaced by non-engaging positions, said strain wave generator being rotatable about the major axis of said deformable member to propagate a rotating strain wave to produce relative movement between said rigid and deformable members.

16. A strain wave drive as recited in claim 15, in which said deformable member comprises a frustum of a cone.

17. In a strain wave drive, a relatively rigid member having a circumferential working surface, an elastically deformable annular member having a working surface portion of a different diameter when undeflected from that of said circumferential working surface, at least said working surface portion of said deformable member comprising in an undeflected condition, an annular body of revolution about a major axis, of line segments inclined to said major axis, said deformable member being open on an axial end at an intersection with a plane passed normally to said major axis, and being substantially closed about said major axis at the opposite axial end, said members being coaxially arranged one circumferentially spaced about the other, said circumferential working surface and said working surface portion being formed circumferentially with cooperating grooved surfaces, and a strain wave generator engaging said deformable member to deflect said working surface portion thereof into engagement with said circumferential working surface of said rigid member at a plurality of circumferentially-spaced positions interspaced by non-engaging positions, said strain wave generator being rotatable about the major axis of revolution of said deformable member to propagate a rotating strain wave to produce relative movement between said rigid and deformable members.

References Cited by the Examiner

UNITED STATES PATENTS

| | | | |
|---|---|---|---|
| 2,600,549 | 6/52 | Ledbetter | 81—57 |
| 2,610,525 | 9/52 | Sprigg | 74—17.8 |
| 2,849,897 | 9/58 | Walma | 74—640 |
| 2,863,336 | 12/58 | Parstorfer | 74—17.8 |
| 2,943,508 | 7/60 | Musser | 74—640 |
| 3,039,324 | 6/62 | Waterfield | 74—640 |
| 3,058,372 | 10/62 | Robinson | 74—640 |
| 3,077,792 | 2/63 | Kinderman | 74—640 |
| 3,091,979 | 6/63 | Shaefer et al. | 74—640 |
| 3,117,763 | 1/64 | Musser | 74—640 |

FOREIGN PATENTS 164,206 10/49 Austria.
430,318 5/11 France.

DON A. WAITE, *Primary Examiner.*